(12) United States Patent
Mentzer

(10) Patent No.: US 7,280,143 B2
(45) Date of Patent: Oct. 9, 2007

(54) CMOS IMAGE SENSOR WITH ACTIVE RESET AND 4-TRANSISTOR PIXELS

(75) Inventor: Ray A. Mentzer, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 766 days.

(21) Appl. No.: 10/413,892

(22) Filed: Apr. 14, 2003

(65) Prior Publication Data
US 2004/0201761 A1 Oct. 14, 2004

(51) Int. Cl.
*H04N 3/14* (2006.01)
*H04N 5/335* (2006.01)

(52) U.S. Cl. ............... 348/308; 348/241; 348/302; 348/310

(58) Field of Classification Search ........ 348/302–310, 348/241, 300
See application file for complete search history.

(56) References Cited

U.S. PATENT DOCUMENTS

| 6,424,375 | B1 | 7/2002 | Fowler |
| 6,777,660 | B1* | 8/2004 | Lee ........................ 250/208.1 |
| 2002/0024058 | A1* | 2/2002 | Marshall et al. ........... 257/170 |

* cited by examiner

*Primary Examiner*—Brian L. Casler
*Assistant Examiner*—Nasir Shahrestani
(74) *Attorney, Agent, or Firm*—RatnerPrestia

(57) ABSTRACT

A CMOS image sensor implementing a low noise active reset operation uses control circuitry outside a pixel sensor array and transistors in a pixel sensor as parts of an amplifier that charges a photodiode node. In one configuration, a reference transistor in the control circuit controls a current mirrored to a column line, and each pixel sensor in the corresponding column contains a transistor that acts as half of a differential pair when the row containing the pixel sensor is selected. A 4-transistor pixel sensor can be implemented using only NMOS transistors with PMOS transistors in the control circuitry used to complete an amplifier circuit.

4 Claims, 2 Drawing Sheets

CMOS IMAGE SENSOR WITH ACTIVE RESET AND 4-TRANSISTOR PIXELS

BACKGROUND

Charge-coupled device (CCD) image sensors and complementary metal-oxide semiconductor (CMOS) image sensors are the two major types of electronic image sensors currently in use. CCD image sensors can provide excellent light sensitivity and high image quality, but manufacturing of CCD image sensors generally requires specialized fabrication processes that make CCD sensors more expensive to make and more difficult to integrate with associated circuitry. CMOS image sensors, on the other hand, can be inexpensively fabricated using standard CMOS manufacturing technology and can be easily integrated on the same die with circuit blocks serving other imaging and non-imaging functions. However, high light sensitivity and high image quality are more difficult to achieve with CMOS image sensors.

FIG. 1 illustrates a conventional CMOS image sensor 100, which includes an array 110 of pixel sensors 120. Control lines (e.g., row lines 112 and column lines 114) in array 110 connect pixel sensors 120 to control circuits such as row control block 130 and column control block 140 that are outside array 110. Generally, a selection signal can be asserted on one of row line 112 to select a row of pixel sensors 110 for reading via column lines 114. FIG. 1 shows only row lines 112 and column lines 114 connected to pixel sensors 120, but more generally, the circuitry in each pixel sensor 120 also connects to additional control lines (not shown).

Capturing an image with CMOS image sensor 100 generally includes a reset operation, an integration operation, and a readout operation. The reset operation resets voltages on the nodes of photodiodes in pixel sensors 120. After the voltages are reset, the integration operation partially discharges (or charges) the nodes via currents that flow through the photodiodes. The current through each photodiode depends on the intensity of the incident light on the photodiode, so that the voltage on the photodiode node in a pixel sensor 120 at the end of the integration operation indicates an integral of the intensity of the incident light on that pixel sensor 120 during the integration operation. The readout operation samples or measures the photodiode voltages, and those voltages can be converted to digital pixel values.

Signal noise can be a significant problem in CMOS image sensor 100, particularly during the reset operations. Ideally, each reset operation sets the photodiode node of a pixel sensor to the same reference voltage level. If a particular pixel sensor 120 is charged to different levels during different reset operations, the pixel values read out from the pixel sensor will be inconsistent from one image to the next, leading to poor image quality.

FIG. 2 is a circuit diagram of a conventional pixel sensor 200 that is designed to provide low noise levels during reset operations. Pixel sensor 200 includes a photodiode 210, a PMOS transistor 220, and five NMOS transistors 230, 240, 250, 260, and 270. Transistors 220, 230, 240, and 250 form a reset circuit 280, and transistors 260 and 270 form a readout circuit 290. Reset circuit 280 serves to reset a voltage Vpd on a node of photodiode 210 before an integration operation. During the integration operation, incident light on photodiode 210 causes a current that pulls voltage Vpd down to a level that depends on the intensity of the incident light. Readout circuit 290 reads out voltage Vpd, which indicates an integrated light intensity for the pixel.

For an active reset operation, a control signal Vpr is high (i.e., at supply voltage level Vdd), control signal Vg is high, and control signal Vr starts low (i.e., at ground level) and begins ramping up. Bias voltage Vbias controls a current through transistor 220, which raises voltages V1 and V2. When voltage V2 nears the threshold voltage of transistor 250, transistor 250 charges up photodiode voltage Vpd, which turns on transistor 230. Voltages V1 and V2 then begin following the rise in control voltage Vr. When control voltage Vr reaches supply voltage Vdd, photodiode voltage Vpd reaches its maximum value, which is less than supply voltage Vdd because of the threshold voltages of NMOS transistors 240 and 250. For example, if supply voltage Vdd is a nominal 2.8 volts, the maximum voltage for signal Vr is about 1.2 volts, which is less than supply voltage Vdd by the threshold voltages of transistors 240, 250, and 130, and the maximum for photodiode voltage Vpd is about 1.8 volts, less than supply voltage Vdd by the threshold voltages of transistors 240 and 250.

To prepare for the integration operation, control voltage Vr is decreased, and then about 1 or 2 µS later, bias voltage Vbias is raised at the end of the reset operation. During the reset operation, the devices in reset circuit 280 operate as an amplifier where photodiode voltage Vpd is greater in voltage than control signal Vr by the threshold voltage of transistor 230. When control signal Vr drops, for example, by about 50 mV, photodiode voltage Vpd must fall to maintain stable closed loop behavior. The only way for photodiode voltage Vpd to fall is for voltages V1 and V2 to fall and pull charge from the photodiode node via the parasitic gate to source capacitance of transistor 250. The small change in signal Vr induces a large change in voltages V1 and V2, shutting off transistor 250 and trapping photodiode voltage Vpd near its maximum level. Control signal Vg can then go low, shutting off transistor 240 to disable the feedback loop allowing the current through photodiode 210 to control photodiode voltage Vpd.

After integration, the readout operation asserts a signal WORD on the word line 112 that is coupled to pixel sensor 200, thereby turning on transistor 270. The bit line 114 connected to pixel sensor 200 is then pulled up via a current through transistor 260, which has a gate at photodiode voltage Vpd, permitting measurement of photodiode voltage Vpd through the effect on bit line 114. U.S. Pat. No. 6,424,375, entitled "Low Noise Active Reset Readout for Image Sensors" further describes operation of pixel sensors similar to pixel sensor 200.

Pixel sensor 200 has some significant drawbacks. In particular, pixel sensor 200 includes five NMOS transistors 230, 240, 250, 260, and 270 and one PMOS transistor 220, which are difficult to fit within the available area of a fine pitch pixel sensor array, especially since PMOS transistor 220 generally requires additional space for isolation. Even for larger pixels, the circuit area required for the transistors 220, 230, 240, 250, 260, and 270 significantly reduces the circuit area available for light-sensing photodiode 210, causing a low fill factor and low light sensitivity. Additionally, pixel noise is sensitive to the impedance ramp generator driving control signal Vr. In a two-dimensional array of pixel sensors, control lines for signal Vr will add resistance to the impedance of the circuit drive control signal Vr, resulting in higher noise levels when pixel sensor 200 is in an image sensing array such as illustrated in FIG. 1.

In view of the drawbacks of existing CMOS image sensors, pixel sensors are sought that contain fewer transistors and control lines while still implementing low-noise reset operations.

SUMMARY

In accordance with an aspect of the invention, a low noise, active reset operation is implemented using pixel sensors that each contain half of a differential pair of transistors of an amplifier while control circuitry that is shared by a set of the pixel sensors (e.g., by a column of pixel sensors) contains the other half. The number of transistors in each pixel sensor can be reduced, for example, from six transistors in one conventional pixel sensor implementing an active reset to four transistors in a pixel sensor in accordance with an exemplary embodiment of the invention. Additionally, PMOS transistors, which are typically larger than NMOS transistors and which require additional integrated circuit area for isolation, are not required in the pixel sensors. Pixel sensors using principles of the present invention can thus be more compact for a fine pitch pixel sensor array and/or provide more circuit area for the photodiode that senses incident light.

One specific embodiment of the invention is an image sensor including an array of pixel sensors and a control circuit outside the array. The control circuit includes a first transistor having a gate under control of a reference signal and a current mirror circuit coupled to drive a control line (e.g., a column line) of the array with a current that mirrors a current through the first transistor. Each pixel sensor coupled to the control line includes a photodiode, a second transistor, and a third transistor. The second transistor has a gate coupled to a node of the photodiode, and the third transistor has a terminal coupled to the node of the photodiode and a gate coupled to a terminal of the second transistor.

Each pixel sensor may further include a fourth transistor coupled to receive a selection signal via a row line or otherwise. The fourth transistor selects whether the pixel sensor conducts the mirrored current. A fifth transistor between the control line and the gate of the third transistor can further be included in each pixel sensor. In this case, the second, third, fourth, and fifth transistors, which can all be NMOS transistors, are the only transistors in a 4-transistor pixel sensor.

In the control circuitry, the current mirror circuit can include a first PMOS transistor and a second PMOS transistor. The first PMOS transistor is connected in series with the first transistor and has a gate and a drain coupled together. The second PMOS transistor has a gate coupled to the gate of the first PMOS transistor and a drain coupled drive to the control line.

Another embodiment of the invention is a reset method for an image sensor. The method includes connecting a selected pixel sensor from an array of pixel sensors to a current mirror circuit in a control circuit outside the array. Connecting the selected pixel sensor may, for example, be achieved by asserting a signal on a row line to select a row of pixel sensors in the array.

A reference signal can then be applied to a gate of a first transistor in the control circuit to control a mirrored current that the current mirror circuit drives through a second transistor. The first transistor generally is one of several reference transistors in the control circuit that control respective mirror currents of respective current mirror circuits in the control circuit. The current mirror circuits drive respective column lines of the array.

In the selected pixel sensor, the second transistor has a gate coupled to a node of a photodiode in the selected pixel sensor. A third transistor has a second terminal coupled to the node of the photodiode and a gate coupled to a terminal of the second transistor. The current through the second transistor controls the gate voltage of the third transistor, which causes a voltage on the photodiode node to follow the reference signal. In particular, the photodiode voltage will increase as the reference voltage ramps up during an active reset operation. The first transistor in the control circuit and the second transistor in the selected pixel sensor together act as a differential pair in an amplifier.

BRIEF DESCRIPTION OF THE DRAWINGS

Use of the same reference symbols in different figures indicates similar or identical items.

DETAILED DESCRIPTION

In accordance with an aspect of the invention, a pixel sensor requires a small area for active reset circuitry because a portion of an amplifier used in the reset circuit is in control circuitry that is shared with other pixel sensors.

Figure 3:
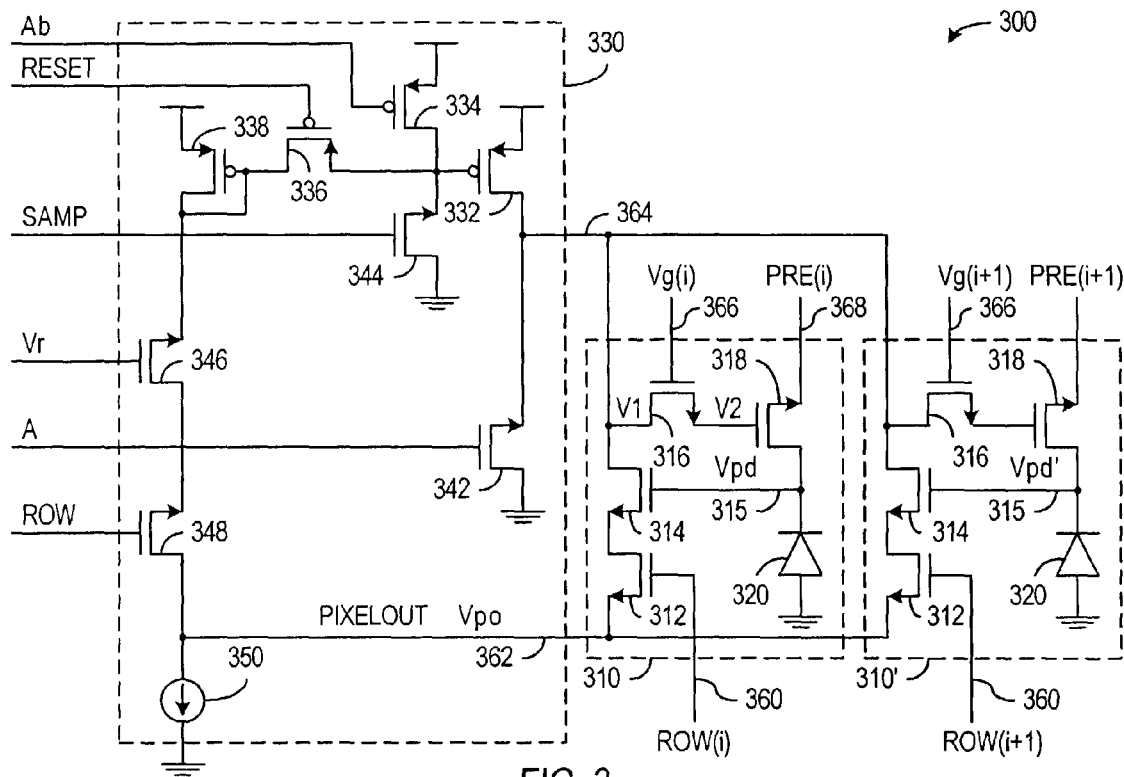
FIG. 3 is a circuit diagram of a portion of a CMOS image sensor in accordance with an embodiment of the invention.

FIG. 3 is a circuit diagram of a portion of a CMOS image sensor 300 in accordance with an embodiment of the invention. In full, image sensor 300 contains an array of substantially identical pixel sensors, but only two pixel sensors 310 and 310' of the array are illustrated in FIG. 3. In an exemplary embodiment, pixel sensors 310 and 310' are in the same column of the sensor array and are connected to a control circuit 330 that pixel sensors 310 and 310' share with the other pixel sensors (not shown) in the column. Other control circuitry (not shown) in CMOS image sensor 300 generates the control signals described below and can be implemented using conventional techniques that are well known in the art.

Pixel sensors 310 and 310' are substantially identical with each containing a photodiode 320 and four NMOS transistors 312, 314, 316, and 318. Transistor 312 has a gate coupled to a row line corresponding to the row containing the pixel sensor 310 or 310', a first terminal coupled to a first column line 362 for the column containing the pixel sensor, and a second terminal coupled to a first terminal of transistor 314. Transistor 314 has a gate coupled to a node 315 of photodiode 320 and a second terminal coupled to a second column line 364 for the column containing the pixel sensor 310 or 310'. Transistor 316 has a gate coupled to a control line 366, a first terminal coupled to column line 364, and a second terminal coupled to the gate of transistor 318. Transistor 318 has a first terminal coupled to photodiode node 315 and a second terminal coupled to a control line 368.

Control circuit 330 as illustrated in FIG. 3 includes PMOS transistors 332, 334, 336, and 338, NMOS transistors 342, 344, 346, and 348, and a current source 350. PMOS transistor 332 is coupled between the supply voltage Vdd and column line 364 and has a gate coupled through transistor 336 to the gate of transistor 338. Transistor 338 has a gate and drain coupled together so that the Current through transistor 332 thus mirrors the current through transistor 338 when a control signal RESET turns on transistor 336. The gate of transistor 332 is also coupled to PMOS transistors 334 and NMOS transistor 344, which respectively operate as pull-up and pull-down devices under the control of signals Ab and SAMP, respectively. NMOS transistor 342 is coupled between column line 364 and a reference voltage (ground). NMOS transistors 346 and 348 are connected in series between PMOS transistor 338 and column line 362, and the gates of transistors 346 and 348 are respectively under the control of signals Vr and ROW. Current source 350 is connected to draw a current from column line 362.

Figure 4:
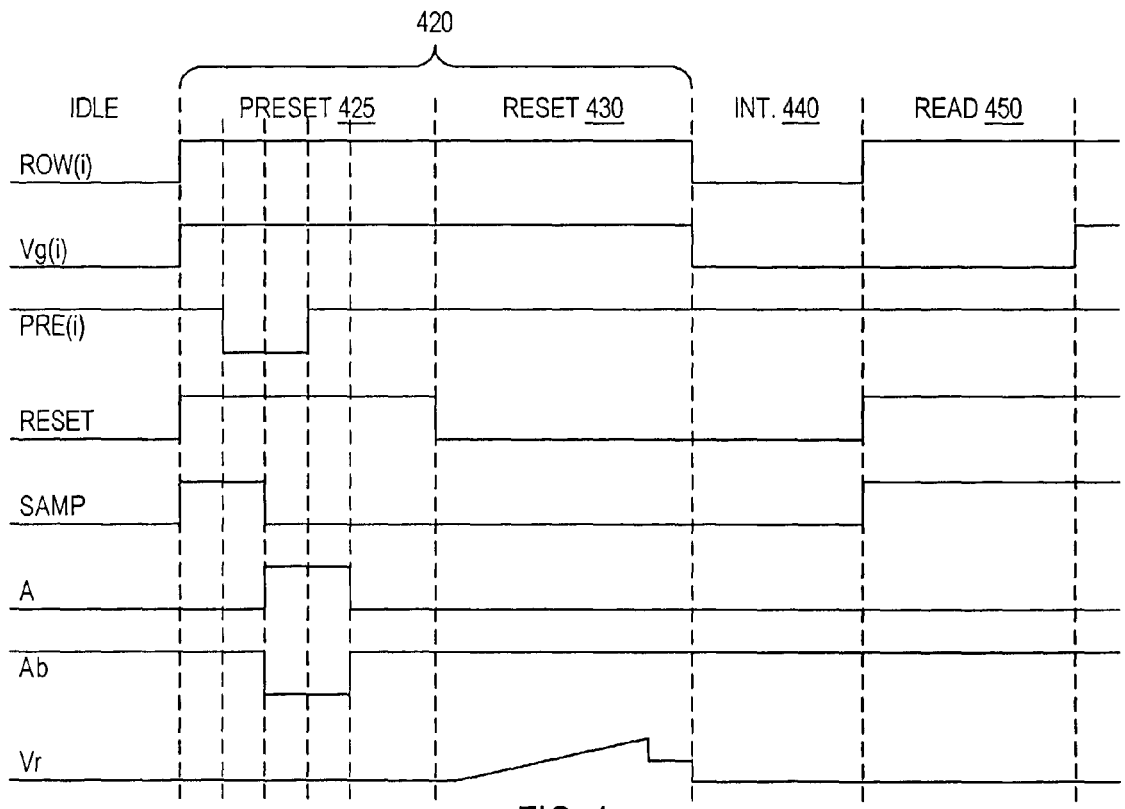
FIG. 4 is a timing diagram of some of the signals used during operation of a pixel sensor in accordance with an embodiment of the invention.

Each pixel sensor 310 or 310' can be operated to perform a reset operation, an integration operation, and a read operation. FIG. 4 is a timing diagram showing the waveforms of some of the signals in CMOS image sensor 300 of FIG. 3 during operation of pixel sensor 310.

A reset operation 420 as illustrated in FIG. 4 includes a preset phase 425 and an active reset phase 430. Control signals A and Vr are initially low during preset phase 420, and control signals ROW(i), Vg(i), PRE(i), RESET, SAMP, and Ab are initially high. Control signals ROW(i), Vg(i), and PRE(i) are for the row containing the pixel sensor 310 being operated and are independent of corresponding control signals (e.g., ROW(i+1), Vg(i+1), and PRE(i+1)) for other rows of the sensor array. Generally, conventional control circuitry for the sensor array includes a "1 of n" decoder (not shown) that is designed to select one set of signals ROW(i), Vg(i), and PRE(i) at a time. Control signal ROW, which is applied to the gate of transistor 348 in control circuit 330, is a logical OR of row signals ROW(i) for all values of row index i and is therefore asserted when any row signal ROW(i) is asserted.

Since control signal Vr remains low during preset phase 425, NMOS transistor 346 shuts off the current path through transistors 338, 346, and 348, and current source 350 draws current from pixel sensor 310 via column line 362.

Control signal Ab initially turns off the pull-up transistor 334 on the gate of PMOS transistor 332, and control signal SAMP initially turns on the pull-down transistor 344 on the gate of PMOS transistor 332. PMOS transistor 332 is thus on while control signal A turns off transistor 342. As a result, PMOS transistor 332 initially pulls up a voltage V1 on control line 364.

In pixel sensor 310, control signal Vg(i) turns on transistor 316, which pulls up a voltage V2 on the gate of NMOS transistor 318. Transistor 318 thus begins pulling up photodiode voltage Vpd, which is the gate voltage of transistor 312. Just before time T1, transistor 332 will be on and pull control line 364 up to supply voltage Vdd. Node voltage V2 will be less that supply voltage Vdd by the threshold voltage of transistor 316. Photodiode voltage Vpd, which is then independent of the current path of current source 350, will be less that voltage V2 by the threshold voltage of transistor 318.

At time T1, control signal PRE(i) is lowered either to ground or an intermediate level that is below the target reset voltage. Importantly, node voltage V2 is then at least a threshold voltage greater than control signal PRE(i). Photodiode voltage Vpd thus discharges through transistor 318 during the time between T1 and T2 to a level that depends on signal PRE(i).

At time T2, control signals SAMP and Ab go low, and control signal A goes high. PMOS transistor 332 shuts off because signal Ab turns on PMOS transistor 334 and signal SAMP turns off transistor 344. Control signal A turns on NMOS transistor 342, which pulls down voltage V1 while transistor 332 is off. The low voltage V1 transfers through transistor 316 to shut off transistor 318 while photodiode voltage Vpd is low. Control signal PRE(i) can thus return to high at time T3 without disturbing photodiode voltage Vpd.

Control signal A returns to low, and control signal Ab returns to high at time T4. At the end of preset phase 420, photodiode voltage Vpd is low. Transistors 334, 336, 342, and 344 are all off, causing control line 364 and the gate of transistor 332 to effectively float.

Active reset phase 430 begins with control signal RESET going low, which turns on transistor 336, connecting transistor 332 to mirror the current through transistor 338. The current through transistor 338 is initially off since control signal Vr starts low during active reset phase 430. Signal Vr then ramps up (e.g., at about 500 mV/µs). Current through transistors 338, 346, and 348 increases as the voltage of control signal Vr increases; and transistor 332, which mirrors current through transistor 338, correspondingly charges up voltage V1 on column line 364. With transistor 316 turned on in pixel sensor 310, voltage V2 on the gate of transistor 318 rises with voltage V1.

Transistor 318 turns on during active reset 430 when voltage V2 nears the threshold voltage of transistor 318. Transistor 318 begins charging photodiode node 315 to increase photodiode voltage Vpd, and the rising photodiode voltage Vpd begins to turn on transistor 314. As a result, current source 350 draws a current that is split between two paths. One current path includes transistors 338, 346, and 348 in control circuit 330. The other current path includes transistor 332 in control circuit 330 and transistors 314 and 312 in pixel sensor 310. If PMOS transistors 332 and 338 are the same size and NMOS transistors 346 and 348 are the same size as transistors 314 and 312, equilibrium results when the currents through both paths are equal. Voltage Vpd then rises with reference voltage Vr because at this time, control circuit 330 and pixel sensor 310 form the amplifier in a closed loop and photodiode voltage Vpd equals the voltage level of signal Vr, neglecting any offset in the amplifier.

Reference voltage Vr reaches its maximum level (e.g., supply Vdd or about 3.3 V) before the end of active reset phase 430 and drops a predetermined amount (e.g., 50 mV). When this happens, the amplifier attempts to decrease photodiode voltage Vpd according to the drop in reference signal Vr. Photodiode voltage Vpd can then pull charge through the overlap capacitance of voltages V2 and Vpd through transistor 318, and a small drop in reference signal Vr can result in a large voltage swing for voltage V2, shutting off transistor 318.

Figure 1:
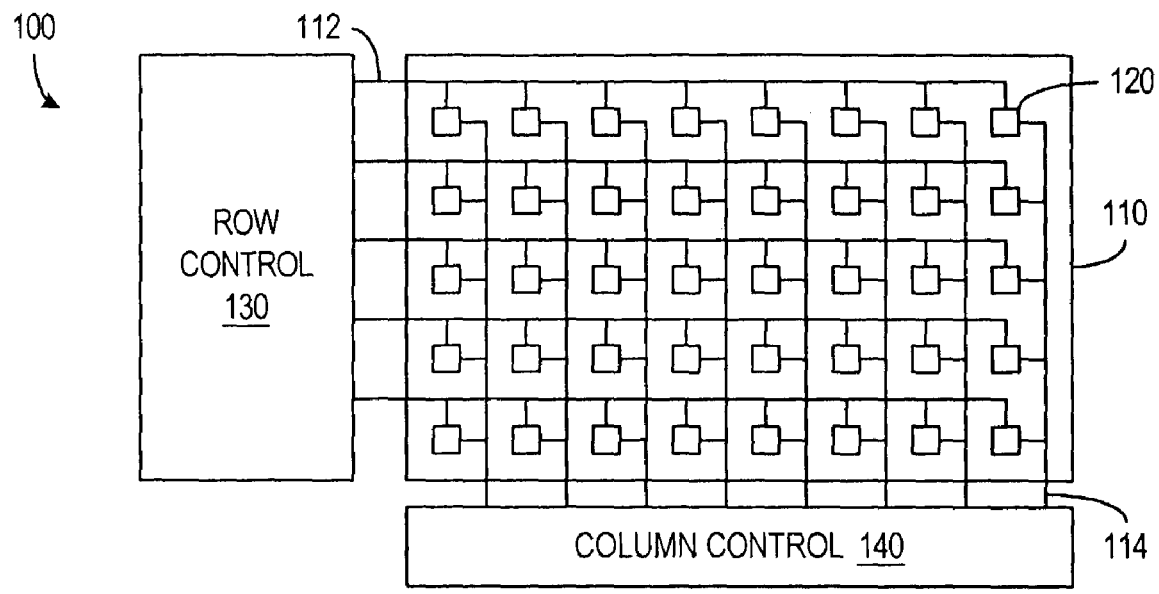
FIG. 1 shows a conventional CMOS image sensor containing an array of pixel sensors.
Figure 2:
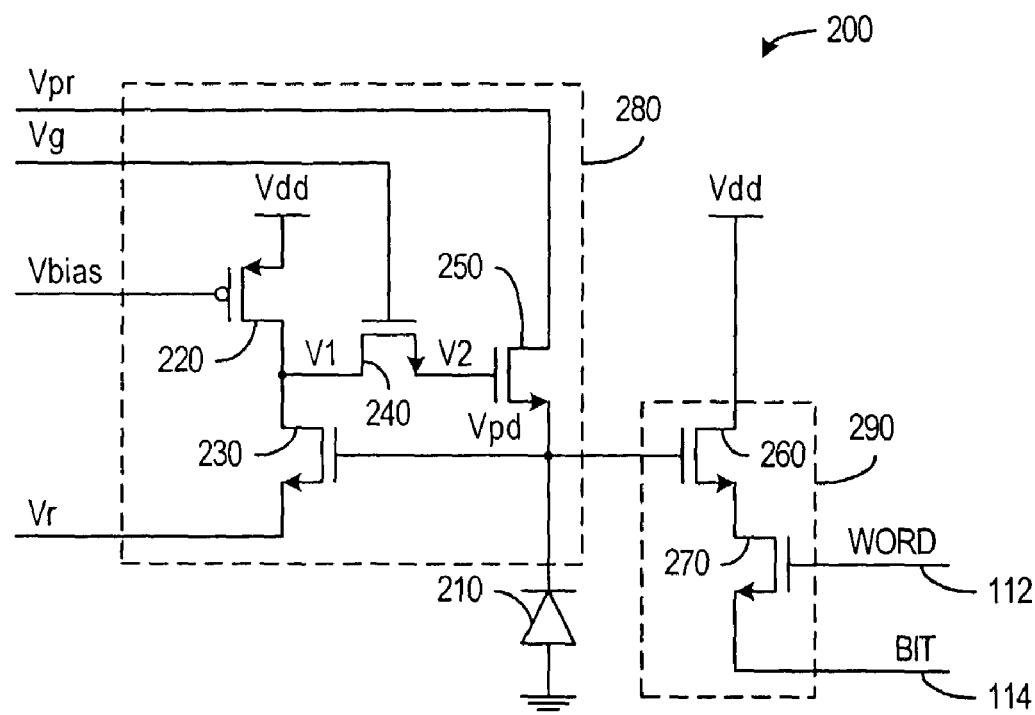
FIG. 2 is a circuit diagram of a conventional pixel sensor that implements a low noise active reset operation.

Noise in the reset photodiode voltage Vpd depends on the capacitance of the nodes of pixel sensor 310. In an exemplary embodiment of the invention, node 315 of photodiode 320 has a capacitance of about 25 femtofarads, and each of column lines 362 and 364 has a capacitance of about 2 picofarads. The node capacitance for voltage V1 is thus much greater in pixel sensor 310 of FIG. 3 than in the conventional pixel sensor 200 of FIG. 2 because voltage V1 in pixel sensor 310 is the voltage on a column line 364. The higher capacitance can result in higher noise levels in reset of voltage Vpd because the amplifier feedback loop suppresses thermal noise that is within the loops bandwidth and the greater the parasitic capacitance at node voltage V1, which is proportional to the array size, decreases the amplifier's bandwidth. However, slowing the ramping rate of reference signal Vr during active reset phase 430 can reduce noise levels. Table 1 indicates the noise levels for the 6T pixel sensors of FIG. 1 and the 4T pixel sensors of FIG. 3 when control lines have a capacitance of about 2 picofarads and nodes with the pixel sensors have a capacitance of about 25 femptofarads and reference signal Vr is ramped from 0 to 1.4 volts (e.g., to a maximum that is less than supply voltage Vdd by two threshold voltage drops) in the ramp time.

TABLE 1

Effect of Ramp Time on Reset Noise

| Ramp Time | Noise in 6T pixel sensor | Noise in 4T pixel sensor |
|---|---|---|
| 10 μs | 206 μV | 256 μV |
| 20 μs | 149 μV | 233 μV |
| 40 μs | 111 μV | 203 μV |
| 80 μs | 85 μV | 170 μV |

At the start of integration operation 440, control signals ROW(i) and Vg(i) are brought low, turning off transistors 312 and 316. Transistor 316 thus traps signal V2 at a voltage that keeps transistor 318 off. Photodiode 320 can then pull photodiode voltage Vpd down by an amount that indicates the integral of the incident light intensity on photodiode 320.

Readout operation 450 begins when control signals SAMP and ROW(i) are asserted high. Signal SAMP turns on NMOS transistor 344, grounding the gate of PMOS transistor 332. Signal ROW(i) turns on transistor 312 in pixel sensor 310, connecting current source 350 to draw current through a path including PMOS transistor 332 in the control circuitry and serially through NMOS transistors 314 and 312 in pixel sensor 310. The photodiode voltage Vpd, which is on the gate of transistor 314, can be determined from the effect transistor 314 has on the current.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. An image sensor comprising:
   an array of pixel sensors; and
   a control circuit outside the array, wherein the control circuit comprises a first transistor having a gate under control of a reference signal and a current mirror circuit coupled to drive a control line of the array with a mirrored current that mirrors a current through the first transistor, wherein a plurality of the pixel sensors in the array are coupled to the control line, and wherein
   each of the pixel sensors that are coupled to the control line comprises:
      a photodiode;
      a second transistor having a gate coupled to a node of the photodiode;
      a third transistor having a terminal coupled to the node of the photodiode and a gate coupled to a terminal of the second transistor;
      a fourth transistor, the fourth transistors in the pixel sensors receiving respective selection signals that select which of the pixel sensors conducts the mirrored current; and
      a fifth transistor that is between the control line and the gate of the third transistor, wherein
   the second, third, fourth, and fifth transistors are the only transistors in the pixel sensor; and
   each of the second, third, fourth, and fifth transistors is an NMOS transistor.

2. The sensor of claim 1, wherein the current mirror circuit comprises:
   a first PMOS transistor connected in series with the first transistor, the first PMOS transistor having a gate and a drain coupled together; and
   a second PMOS transistor having a gate coupled to the gate of the first PMOS transistor and a drain coupled to the control line.

3. The sensor of claim 1, wherein:
   the control line is one of a plurality of column lines in the array; and
   for each of the column lines, the control circuit comprises a reference transistor having a gate under control of the reference signal and a current mirror circuit coupled to drive the column line with a mirrored current that mirrors a current through the reference transistor, the first transistor being the reference transistor for one of the column lines.

4. The sensor of claim 1, wherein the control line is a column line of the array, and the fourth transistors have gates coupled to respective row lines of the array.

* * * * *